L. ROUANET.
ADJUSTABLE GAGE.
APPLICATION FILED DEC. 28, 1917.
1,343,479.
Patented June 15, 1920.
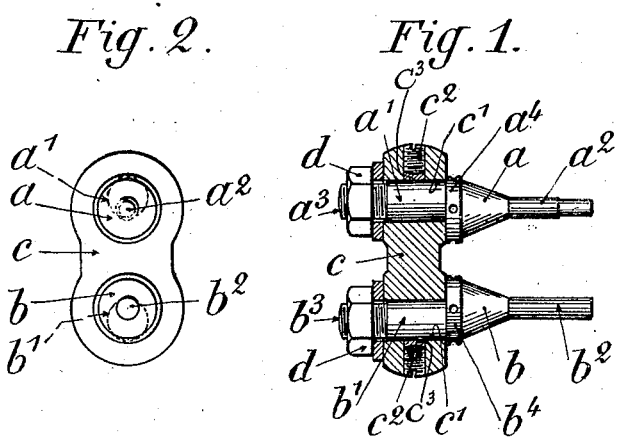
INVENTOR:
Louis Rouanet
By
Wm Wallace White
ATT'Y.

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE.

ADJUSTABLE GAGE.

1,343,479.          Specification of Letters Patent.     Patented June 15, 1920.

Application filed December 28, 1917. Serial No. 209,331.

*To all whom it may concern:*

Be it known that I, LOUIS ROUANET, citizen of the Republic of France, residing at 42 Rue Franklin, Ivry-Port, Seine, in the Republic of France, have invented new and useful Improvements in Adjustable Gages, of which the following is a specification.

The object of the present invention is an adjustable gage to be used either as a plain gage or as a limit gage, in the verification or manufacture of different pieces, the said gage being especially adapted for verification of exterior diameters, bores, etc.

The invention consists in the special arrangement of the different parts of a gage of this kind which is made up of two cylindrical rods adapted to rotate at one end in holes in a base, the journaled part of each rod being disposed eccentrically with reference to the other end, and these latter ends constitute the gaging contacts. A set of screws and nuts is employed for setting or clamping the different parts of the gage after having made the adjustment. One of these two cylindrical rods can be made at the outer or gage end in two different diameters thus forming a limit gage.

The invention also consists in the use of said gage more especially for measurements of an exterior diameter by making the proposed adjustment upon the distance between the inner side of the rods, while on the contrary it is used for measurements upon borers by making the adjustment upon the distance between the outer sides of the rods. In a gage of the present type provided with the above mentioned eccentric mountings it is always possible to obtain a precise adjustment, even after the wear of the parts.

In the accompanying drawing:

Figure 1 represents in sectional view a limit gage constructed according to the present invention.

Fig. 2 is an end view of the same gage.

The gage shown in the drawing is composed of two rods $a$ and $b$ whose ends $a^1$ and $b^1$ are adapted to rotate within the holes $c^1$ of a base $c$, these ends being eccentric with reference to the other ends $a^2$ and $b^2$ which latter ends serve to form the gaging contacts. The rod $a$ is made with two different diameters at the end $a^2$, the outer reduced portion forming in combination with the rod $b^2$ the "go" gage and the inner full diameter portion forming in combination with the said rod $b^2$, the "not go" gage.

The ends $a^1$ and $b^1$ of the rods $a$ and $b$ terminate in a threaded portion $a^3$ and $b^3$ respectively, on each of which is disposed a nut $d$ for tightening up the whole after the adjustment. In order to facilitate the adjustment, each rod carries a cylindrical base portion $a^4$ and $b^4$, respectively, adapted to bear against the base and containing holes for receiving a pin employed for the adjustment. The set screws $c^2$ are employed for fixing the rods $a$ and $b$ in the base $c$ before tightening up the nuts $d$. Said screws bear upon the rods $a$, $b$, through the medium of small thrust disks $c^3$, which prevent the screw from forming recesses in the walls of the rods.

Having now described my invention, what I claim as new and desire to secure by Letters Patent is:

1. A gage comprising in combination a base provided with two parallel holes, two rods screw threaded at one end, adapted to rotate within said holes and having their other end eccentrically disposed with respect to the axis of the corresponding hole, nuts threaded on the screw threaded ends of the said rods, and set screws for fixing the said rods in the base before tightening up the said nuts, substantially as described and for the purpose set forth.

2. A gage comprising in combination a base provided with two parallel holes, two rods screw threaded at one end, adapted to rotate within said holes and having their other end eccentrically disposed with respect to the axis of the corresponding hole, one of these two eccentric ends being made with two different diameters, nuts threaded on the screw threaded ends of the said rods, and set screws for fixing the said rods in the base before tightening up the said nuts, substantially as described and for the purpose set forth.

In testimony whereof I have signed my name to this specification in the presence of two subscribing witnesses.

LOUIS ROUANET.

Witnesses:
    CHAS. P. PRESSLY,
    HECTOR LEVY.